Aug. 12, 1930.  J. B. JURAD  1,772,835
FASTENER
Filed Dec. 19, 1928
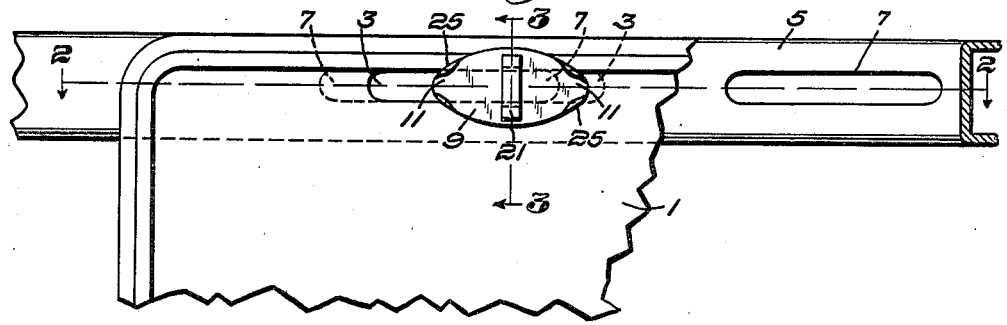
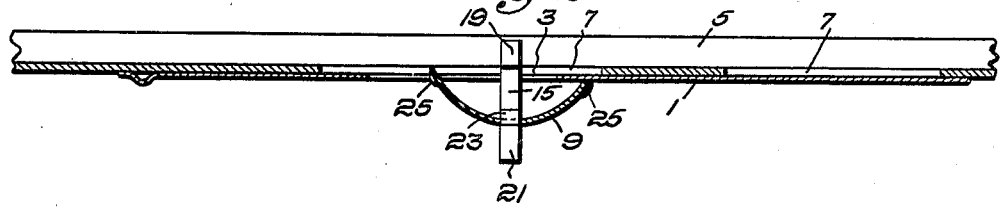
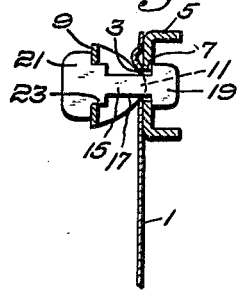
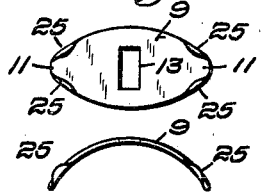
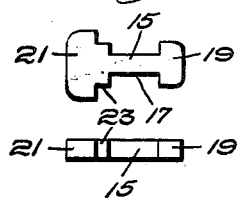
Inventor:
Joseph B. Jurad,
by Emery Booth Janney & Varney
Attys Patented Aug. 12, 1930

1,772,835

UNITED STATES PATENT OFFICE

JOSEPH B. JURAD, OF NEWTON, MASSACHUSETTS

FASTENER

Application filed December 19, 1928. Serial No. 327,095.

My invention relates to detachable securing devices, and particularly, but not exclusively, to those adapted to secure number plates for automobiles and the like to the vehicle.

Heretofore it has been common practice to secure number plates to automotive vehicles by use of bolts, leather straps, and the like, the former being difficult to detach owing to the likelihood of rust, and the latter being expensive and not providing a rigid attachment. My invention has among its objects the production of an inexpensively constructed securing device for rigidly securing the number plate in position with avoidance of screw threads or the like preventing ready attachment and assemblage.

In the drawing:—

Fig. 1 shows in fragmentary elevation a number plate for an automobile secured to its supporting bracket;

Figs. 2 and 3 respectively are sections on the lines 2—2 and 3—3 of Fig. 1;

Fig. 4 is a plan and elevation of the spring member constructed according to Figs. 1 to 3; and Fig. 5 is a plan and elevation of the key member constructed according to Figs. 1 to 3.

The standard number plate 1 is provided adjacent its upper edge near opposite sides with a longitudinal slot 3, while the standard bracket 5 of an automobile is provided with a series of slots 7 distributed throughout its length, these cooperating slots being provided for the purpose of securing the number plates of different lengths to the bracket.

Referring to the drawing, which shows one example of a securing means constructed according to the invention, I have provided a spring plate 9 which tapers toward its opposite ends 11, said ends preferably being rounded as clearly shown in Figs. 1 and 4, the spring being bowed or curved in profile as clearly shown in Figs. 2 and 4. Preferably the distance between the ends of the spring member are approximately the length of the slot 3, so that said slot, if desired, may be hidden as hereinafter explained. As shown, the spring member at its central portion is provided with a transverse rectangular slot 13.

As illustrated, extending through the spring plate is a key member 15, comprising a shank portion 17, and having the heads 19 and 21 at opposite ends thereof, the head 21 being joined to the shank by means of a shoulder portion 23. As clearly illustrated in Fig. 5, the key member is of uniform thickness, and, as such, conveniently may be stamped from a metal sheet.

Conveniently the parts are so proportioned that the shank portion 17 of the key is of such dimensions that it may rotate in the slots 3, 7 and 13, unless restrained from doing so, while the shoulder portion 23 of the key is of such dimensions that it is secured against rotation relative to the spring plate 9 when received in the slot 13 of the latter.

In using the device, the key member, turned at 90 degrees about its longitudinal axis from the position shown in Figs. 1 to 3, is entered into the slot 13 of the spring member 9, and then passed through the aligned slots 3 and 7 respectively formed in the number plate and bracket, whereupon turning the key member into the position of parts shown by the drawing will securely lock the parts together by causing the head 19 to engage with the bracket 5.

As shown, one or both of the opposite rounded ends of the spring member 9 are adapted to enter the slot 3 in the number plate, which results in securing said spring member, and consequently the key member, against accidental rotation when the parts are in the position shown in Fig. 1, the spring member being under compression when in this position, so as to force the head 19, of the key member against the inner surface of the bracket 5. As shown in the drawing, only one end of the spring member engages with the slot 3, a necessary condition which will exist when this slot overlaps to some extent the slot 7 in the bracket. However, the spring member ordinarily will be placed so as to have both ends in engagement with the slot 3, with the result that the spring member is better secured against rotation and the slot 3 is hidden, which will improve the appearance of the number plate assembly.

In detaching the parts the head 21 may be grasped by the fingers, or by a pair of pliers, or other tool, and forcibly rotated, which will "cam" the end or ends of the spring member out of the slot in the number plate, permitting the key member to be turned into such position that the head 19 thereof may be withdrawn from the registering slots in the bracket and number plate. Conveniently for preventing binding of the ends of the spring member against the edges of the slot in the number plate, said ends at the portions of the side edges thereof adapted to contact with the edges of said slot, are rolled or bent slightly upward as indicated at 25 in Figs. 2 and 4.

It will be understood that the securing means illustrated constitutes but one embodiment of the invention, and that wide deviations may be made therefrom without departing from the spirit of the invention.

I claim:

1. A device for securing slotted articles of the character described to a slotted supporting member or the like comprising, in combination, a key member having a head adapted to enter the slots of said article and supporting member and to be secured against removal therefrom when rotated to a predetermined position, a bowed spring member cooperating with said key member for placing the latter under tension, an end portion of said spring member adapted to engage with the walls of said slot of said article for preventing rotation of said spring member.

2. A device for securing slotted articles of the character described to a slotted supporting member or the like comprising, in combination, a key member having a head adapted to enter the slots of said article and supporting member and to be secured against removal therefrom when rotated to a predetermined position, a bowed spring member cooperating with said key member for placing the latter under tension, said spring member and key member having cooperating portions for locking one to the other against relative rotation, and said spring member adapted to engage at its opposite end portions with the walls of said slot of said article to prevent rotation of said spring member.

3. A device for securing slotted articles of the character described to a slotted supporting member or the like comprising, in combination, a key member having a head adapted to enter the slots of said article and supporting members and to be secured against removal therefrom when rotated to a predetermined position, a bowed spring member cooperating with said key member for placing the latter under tension, said spring member and key member having cooperating portions for locking one to the other against relative rotation, and said spring member having an end portion adapted to engage with the walls of said slot of said article normally to prevent rotation thereof, said portion formed for camming it from said walls when said member is forcibly rotated.

4. A device for securing slotted articles of the character described to a slotted supporting member or the like comprising, in combination, a key member having a head adapted to enter the slots of said article and supporting member and to be secured against removal therefrom when rotated to a predetermined position, a bowed spring member adapted to engage at opposite ends thereof with the walls of the slot of said article for preventing rotation thereof, said key member removably carried by the center portion of said spring member and being placed under tension thereby.

5. A device for securing slotted articles of the character described to a slotted supporting member or the like comprising, in combination, a key member having a head adapted to enter the slots of said article and supporting member and to be secured against removal therefrom when rotated to a predetermined position, a bowed spring member adapted to engage at opposite ends thereof with the walls of the slot of said article, said ends formed for camming from said walls when said spring member is forcibly rotated, said key member removably carried by the center portion of said spring member and being placed under tension thereby.

In testimony whereof, I have signed my name to this specification.

JOSEPH B. JURAD.